United States Patent Office 3,158,627
Patented Nov. 24, 1964

3,158,627
7,17β-DIOXYGENATED ANDROST-4-EN-3-ONE
Stephen Kraychy, Northbrook, Ill., assignor to G. D. Searle & Co., Chicago, Ill., a corporation of Delaware
No Drawing. Filed Oct. 23, 1962, Ser. No. 232,581
5 Claims. (Cl. 260—397.4)

This invention relates to 7,17β-dioxygenated androst-4-en-3-one and processes for the manufacture thereof. More particularly, this invention provides new and useful chemical compounds of the formula

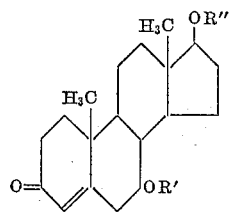

wherein R' and R" each represent hydrogen or an acyl radical and the 7-substituent, OR', can be in either the alpha or beta configuration. Among the acyl radicals represented by R' and R", alkanoyl radicals—especially *lower* alkanoyl radicals—are preferred. Those skilled in the art will recongize alkanoyl radicals as having the formula alkyl—CO— the alkyl grouping called for being such as methyl, ethyl, propyl, isopropyl, butyl, iso-butyl, sec-butyl, tert-butyl, pentyl, neopentyl, hexyl, isohexyl, or like —$C_nH_{2n+1}$ moiety. Alkanoyl radicals containing fewer than 8 carbon atoms are, for the purposes of this invention, considered *lower* alkanoyl radicals.

The compounds to which this invention relates are useful by reason of their valuable pharmacological properties. Thus, for example, they are anabolic and androgenic agents.

Manufacture of the 7-hydroxy compounds hereof proceeds by contacting an appropriate 7-hydroxyandrost-4-ene-3,17-dione (configuration of the 7-hydroxyl being as desired in the final product) with sodium borohydride in methanol solution to convert the carbonyls therein to hydroxyls, then contacting the resultant triol with finely-ground manganese dioxide in 2-propanol. From the 7-hydroxyl compounds thus obtained the corresponding esters hereof derive on contact with an appropriate alkanoic acid anhydride in the presence of pyridine.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of material and of methods, may be practiced without departing from the purpose and intent of this disclosure. Throughout the examples hereinafter set forth, temperatures are given in degrees centigrade and relative amounts of materials in parts by weight, except as otherwise noted. Specific rotations refer to the D line of sodium, the compound in each instance being dissolved 1% in chloroform solution.

EXAMPLE 1

A. *Androst-4-ene-3,7α,17β-triol.*—To a solution of 293 parts of 7α-hydroxyandrost-4-en-3,17-dione in 16,000 parts of methanol is slowly added, with agitation at room temperatures, a solution of 100 parts of sodium borohydride in 1200 parts of methanol. The resultant solution is allowed to stand at room temperatures overnight, then poured into 100,000 parts of water. The mixture thus obtained is neutralized with acetic acid and thereupon extracted with chloroform. The chloroform extract is washed with water, dried over anhydrous sodium sulfate, and stripped of solvent by distillation. The residue is androst-4-ene-3,7α,17β-triol.

B. *7α,17β-dihydroxyandrost-4-en-3-one.*—To a solution of 185 parts of androst-4-ene-3,7α,17β-triol (prepared as described in the foregoing Part A of this example) in 8000 parts of 2-propanol is added 2000 parts of finely-ground manganese dioxide. The resultant mixture is maintained with agitation at room temperatures overnight, then filtered. The filtrate is evaporated to dryness and the residue crystallized from acetone. Recrystallization from ethyl acetate affords 7α,17β-dihydroxyandrost-4-en-3-one melting at 221–223° and further characterized by a specific rotation at 27° of +88.5°. The product has the formula

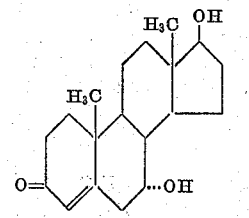

EXAMPLE 2

*7α,17β-diacetoxyandrost-4-en-3-one.*—A solution of 41 parts of 7α,17β-dihydroxyandrost-4-en-3-one in a mixture of 200 parts of pyridine with 100 parts of acetic anhydride is allowed to stand at room temperatures overnight, then poured onto approximately 3000 parts of ice. The precipitate thrown down is filtered off and recrystallized from ethyl acetate, affording 7α,17β-diacetoxyandrost-4-en-3-one melting at approximately 188.5–189.5° and further characterized by a specific rotation at 28° of +4.5°. The product has the formula

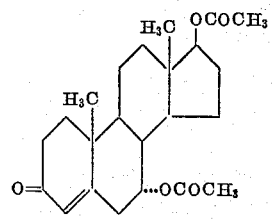

EXAMPLE 3

A. *Androst-4-ene-3,7β,17β-triol.*—To a solution of 31 parts of 7β-hydroxyandrost-4-en-3,17-dione in 1260 parts of methanol is slowly added, at room temperatures with agitation, a solution of 10 parts of sodium borohydride in 120 parts of methanol. The resultant solution is allowed to stand at room temperatures overnight, then poured into 10,000 parts of water. The mixture thus obtained is neutralized with acetic acid and thereupon extracted with chloroform. The chloroform extract is washed with water, dried over anhydrous sodium sulfate, and stripped of solvent by distillation. The residue is androst-4-ene-3,7β,17β-triol.

B. *7β,17β-dihydroxyandrost-4-en-3-one.*—To a solution of 24 parts of androst-4-ene-3,7β,17β-triol (prepared as described in the foregoing Part A of this example) in 800 parts of 2-propanol is added, with agitation, 200 parts of finely-ground manganese dioxide. The resultant mixture is maintained with agitation at room temperatures overnight, then filtered. The filtrate is stripped of solvent by vacuum distillation. The residue, consecutively recrystallized from acetone and ethyl acetate, affords 7β,17β- dihydroxyandrost-4-en-3-one melting at approximately 196–197° and further characterized by a specific rotation at 29° of +103°. The product has the formula

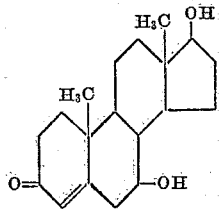

EXAMPLE 4

*7β,17β-diacetoxyandrost-4-en-3-one.*—Substitution of 52 parts of 7β,17β-dihydroxyandrost-4-en-3-one for the 7α,17β-dihydroxyandrost-4-en-3-one called for in Example 2 affords, by the procedure there detailed, 7β,17β-diacetoxyandrost-4-en-3-one melting at approximately 182–183° and further characterized by a specific rotation at 28° of +89.5°. The product has the formula

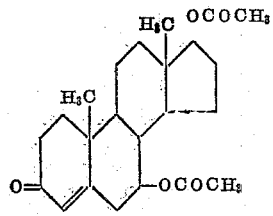

What is claimed is:
1. A compound selected from the group consisting of a compound of the formula

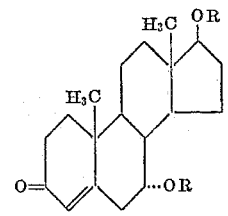

and a compound of the formula

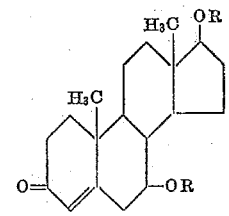

wherein R is selected from the group consisting of hydrogen and lower alkanoyls.
2. 7α,17β-dihydroxyandrost-4-en-3-one.
3. 7α,17β-diacetoxyandrost-4-en-3-one.
4. 7β,17β-dihydroxyandrost-4-en-3-one.
5. 7β,17β-diacetoxyandrost-4-en-3-one.

References Cited in the file of this patent
UNITED STATES PATENTS
2,960,513    Thoma et al. _____ Nov. 15, 1960

OTHER REFERENCES
Tweit et al.: "J. Organic Chemistry," 1961, vol. 26, pp. 2856–2859.